United States Patent [19]

St. Clair et al.

[11] Patent Number: 4,680,522
[45] Date of Patent: Jul. 14, 1987

[54] RADIATION PATH AXIS DIRECTING SYSTEM

[75] Inventors: John S. St. Clair, Dunfermline; Nicolas L. Brignall, Edinburgh, both of Scotland

[73] Assignee: Ferranti plc, Cheshire, England

[21] Appl. No.: 796,116

[22] Filed: Nov. 8, 1985

[30] Foreign Application Priority Data

Nov. 9, 1984 [GB] United Kingdom ............... 8425859

[51] Int. Cl.⁴ .................. G05B 1/06; G02B 26/08; G01C 3/08
[52] U.S. Cl. .................... 318/665; 350/486; 350/636; 353/98; 356/5
[58] Field of Search ............... 318/664, 640, 648, 649; 350/97, 99, 100, 484, 486, 487, 600, 631, 632, 636, 543, 622; 343/878; 353/98; 250/203 R; 356/5, 21-26, 3, 248, 16

[56] References Cited

U.S. PATENT DOCUMENTS

| | | | |
|---|---|---|---|
| 3,518,016 | 6/1970 | Burdin | 356/248 |
| 3,615,135 | 10/1971 | Frazer | 356/5 |
| 3,914,029 | 10/1975 | Hoplock | 350/636 |
| 3,927,360 | 12/1975 | MacMullan | 318/611 |
| 4,087,061 | 5/1978 | Burt | 350/500 |
| 4,117,386 | 9/1978 | Cohen | 318/664 |
| 4,209,253 | 6/1980 | Hughes | 350/486 |
| 4,329,579 | 5/1982 | Jansen | 250/203 R |
| 4,383,520 | 5/1983 | Huebl | 350/636 |
| 4,393,597 | 7/1983 | Picard | 356/248 |
| 4,470,698 | 9/1984 | Green | 250/203 R |
| 4,544,241 | 10/1985 | Labudde | 350/486 |
| 4,574,227 | 3/1986 | Herder | 318/616 |

FOREIGN PATENT DOCUMENTS

| | | |
|---|---|---|
| 2534752 | 10/1977 | Fed. Rep. of Germany ...... 350/486 |
| 672579 | 5/1952 | United Kingdom . |
| 970020 | 9/1964 | United Kingdom . |
| 1568161 | 5/1980 | United Kingdom . |

*Primary Examiner*—William M. Shoop, Jr.
*Assistant Examiner*—Patrick C. Keane
*Attorney, Agent, or Firm*—Kerkam, Stowell, Kondracki & Clarke

[57] ABSTRACT

A radiation path directing system, such as sighting means 10, (FIG. 1) has an imaging detector (not shown) below the apparatus has a field of view centered on a sightline deflected from the vertical axis 22 by mirror 12 rotatable in elevation about axis 13 in yoke 14 and directed in azimuth by rotation of the yoke about orthogonal azimuth axis 22. To enable rapid changes in sightline azimuth and/or if the yoke assembly has a limited extend of rotation the mirror 12 can be flipped about axis 13 to divert the sightline azimuth by 180° insteads of moving the complete (and possibly heavy) yoke assembly. In one simple construction a yoke rotation of ±90° and mirror flipping enables a 360° sightline to be described. Preferably conditions are defined relating current yoke position and demanded sightline azimuth (FIG. 5) to determine whether the sightline is achieved by yoke rotation with or without mirror flipping.

26 Claims, 10 Drawing Figures

RADIATION PATH AXIS DIRECTING SYSTEM

This invention relates to steerable radiation path axis directing systems and in particular to such systems affording a radiation path having an axis steerable through 360° about at least one axis.

Radiation path directing systems may be employed to direct a beam of radio or optical radiation emitted by a source along a path centred on a chosen path axis or to direct radio or optical radiation onto a receiver, the path then comprising a field of view centered in the chosen path axis.

While the invention is applicable to both the system of the invention is particularly, but not exclusively, applicable to so-called sighting sytems in which radiation from an object is directed onto a detector and the radiation path axis is called the sightline.

Steerable sightline systems are known in which a reflector, such as a plane optical mirror, is supported pivotally about a first, say, horizontal, elevation axis within a yoke assembly itself supported for rotation about a second, vertical, azimuth axis.

An electro-optical or direct optical viewing system located on the azimuth axis receives radiation by way of the reflector so that by positioning the reflector and yoke assembly with respect to their rotational axes a system sightline direction can be defined in elevation and azimuth forming the central axis of a field of view.

It is frequently desired to attain a demanded sightline direction rapidly and accurately or to make frequent and rapid direction increments when tracking one or more moving objects. Also the reflector orientation may be gyro-stabilised, particularly when the sighting system is carried by a moving platform such as a vehicle, to accommodate disturbances of the platform.

The motions of the yoke and reflector about their respective axes are usually then performed by servo-controlled motors having associated therewith feedback transducers for sensing angular position and/or rotation rate.

It is also frequently required that the sightline be directable to, and give a substantially uninterrupted field of view at, any azimuth angle within a 360° panorama.

Such requirements of panoramic sightline direction and rapid positioning of elements may be in conflict with constructional features essential to permit operation, a conflict which can be exacerbated by additional requirements of optical aperture (and the optical radiation band of interest) adding to the dimensions and thus the mass of the component parts.

Considering rotation of a sightline about the azimuth axis, for minimum delay in rotating between an existing, or originating, sightline azimuth (SO) and a demanded sightline azimuth (SD) the yoke assembly requires to take the shortest route, that is, requires the ability to rotate about the azimuth axis in both senses. Furthermore, several consecutive rotations may need to be in the same sense leading to a net rotation about the axis of more than 360°.

Such motions are normally accommodated by having electrical connection between moving and stationary parts made by way of slip-ring assemblies. Such slip ring assemblies may not be satisfactory for a number of reasons, such as losses and noise in transducer signals particularly when they have to pass by way of a second slip ring assembly (say to the reflector), and when high power drive motors are employed to facilitate high rotation rates.

The alternative, a cable supply arrangement, restricts rotation of the yoke assembly about the azimuth axis to not significantly greater than 360°, that is, considering the yoke assembly to be displaced by 0° from a datum point at which the cables are unstressed, the yoke assembly can be rotated through approximately ±180°. Although this may appear to satisfy the requirement for a sightline directable through 360° it will be appreciated that in order to track or undertake a series of displacements taking the sightline through the ±180° displacement position, the yoke assembly has to be counter-rotated by substantially 360° from say +180° to −180° to enable rotation to be continued, during which time the sightline is lost.

This is also true for smaller signals, say from a displacement angle of +100° to −100°, the yoke requiring to rotate 200° via the 0° datum position rather than a shorter 160° by way of the 180° position, all of which is contrary to the requirement of acquiring a new sightline direction in minimum time.

Corresponding considerations apply to other wavelengths of radiation and to radiation emitted in a beam whose axis is required to be similarly steerable.

It is an object of the present invention to provide a radiation path axis directing system which mitigates the problem of axis direction limitation and/or permits optimum radiation path axis movement between demanded directions.

According to the present invention a radiation path axis directing system comprises a body rotatable about a first axis each side of a datum angular position and supporting a reflector rotatable about a second axis in the body orthogonal to the first, said reflector being arranged to deflect a radiation path axis along the first axis either side of the second axis in dependence on the orientation of the reflector about the second axis, and control means including a body drive motor responsive to demand of a new radiation path axis to position the body at an angular position with respect to the datum position between the limit points at which the second axis is orthogonal to the demanded radiation path axis and orientate the reflector about the second axis to cause the radiation path axis to be deflected at the appropriate side of the second axis to define the direction of the demanded radiation path axis.

Taking as an example of an optical sightline directing system an embodiment of the invention will now be described with reference to the accompanying drawings, in which.

Figure 1:
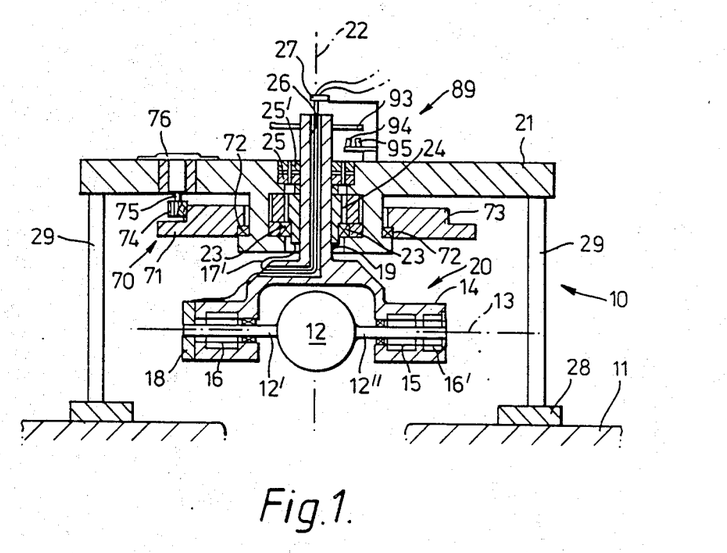
FIG. 1 is a sectional elevation through a steerable sighting system according to the present invention.

Referring to FIG. 1 a steerable sighting system 10 is carried by a platform 11 which may be a moving vehicle. The system is arranged to direct a sightline axis about a first, nominally vertical, azimuth axis to define a sightline azimuth direction and about a second, nominally, horizontal elevation axis to define the sightline elevation. The system comprises a plane reflector 12 pivotable about the elevation axis 13 in a yoke 14 by a direct drive elevation motor 15 carried by the yoke and an axle of the reflector 12. The yoke and reflector axle also carry the relatively movable parts of an angular position sensing transducer 16, which provides signals giving a measure of the angular orientation of the reflector about the elevation axis, and of a tachometer 16′ which provides signals representing the angular velocity of the motor. Electrical power to movable elements of the motor 15 and transducers 16 and 16′ passes by way of cables 17 affixed to the yoke by way of a slip ring arrangement 18. Slip rings, despite the disadvantages noted above for signal transfer, are employed for the supply of power as the reflector may be expected to make rapid pivotal movements in which the centrifugal forces applied to other forms of cable connection could result in excessive wear thereof. The yoke 14 has a yoke shaft 19 extending therefrom at right angles to the elevation axis 13. This reflector supporting body formed by the yoke 14, shaft 19 and the reflector assembly carried thereby may conveniently be called the yoke assembly 20.

A support member 21 carries the yoke assembly suspended therefrom by way of the shaft 19 which is supported for rotation about the nominally vertical azimuth axis 22 by bearings 23.

The yoke assembly is driven in rotation by a body drive motor 24. The motor is a direct drive, the stator being carried by the support member 21 and armature by the shaft 19. The support member 21 and yoke assembly also carry the relatively movable components of an angle resolver 25 and a rotation rate sensing tachometer 25′.

The supply and signal cables 17 to the reflector assembly 20 and corresponding supply and signal cables 17′ to the motor and sensing transducers on the yoke shaft extended by way of a passage 26 along longitudinal axis of the shaft 19, said cables being clamped to the yoke adjacent one end of the passage and by clamping means 27 to the support member adjacent the other end. The cables are arranged to be unstressed when the yoke assembly is at a datum point in respect of rotation about the azimuth axis. It will be appreciated that the total extent of rotation of the yoke assembly about the azimuth axis 22 is limited by cables 17 and 17′ but a distance of the order of 10-15 cms. between clamping points is sufficient to permit rotation in excess of ±180° with only tolerable torsional forces applied to the cables. In general a rotational limit of ±L° from the datum point to limit points may be considered to apply, where L is between 90° and 180° inclusive.

The support member 21 is mounted on an annular base member 28 by a plurality of legs 29 disposed around the periphery thereof, the legs having a minimal thickness in the azimuth direction, that is, in a direction transverse to the radial sightline direction, to minimise obscuration. A plurality of low obscuration bracing elements, such as rods or wires (not shown) extend diagonally between the support member and/or base member and/or legs to provide torsional stiffness to the support member with respect to the platform 11 about the azimuth axis.

The remaining features shown in FIG. 1 will be described hereinafter.

The operating principle of the sighting system of the present invention is most readily explained with reference to the schematic illustrations of FIGS. 2 and 3.

Figures 2, 3:
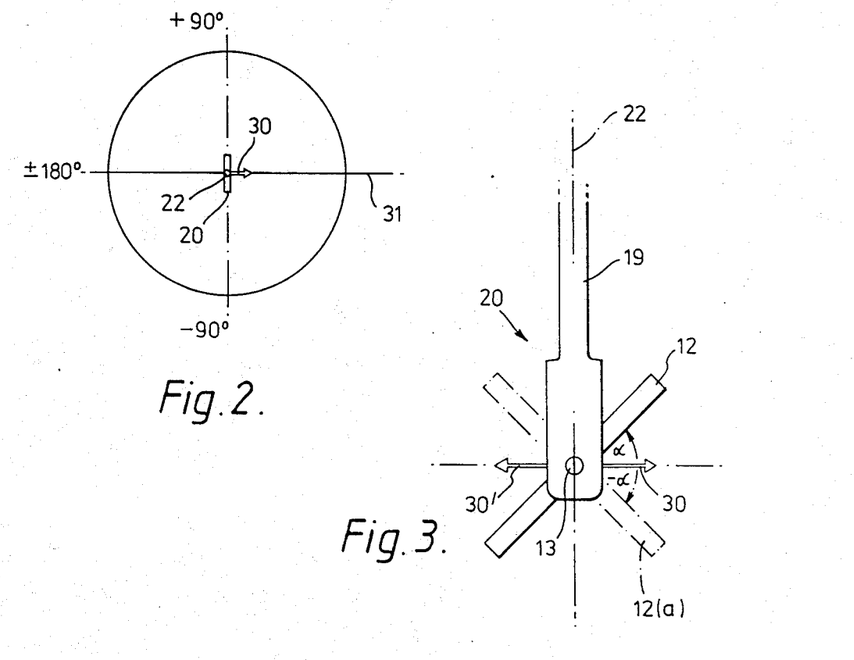
FIG. 2 is a schematic representation in plan of the positioning of the sighting system of FIG. 1 about an azimuth axis.
FIG. 3 is a schematic sectional elevation in a plane orthogonal to that of FIG. 1 illustrating positioning of the reflector thereof.

FIG. 2 may be considered as a plan view of the system of FIG. 1, that is, along the azimuth axis 22 showing the yoke assembly 20 and indicating by arrow 30 the sightline direction in terms of an angle (positive or negative) with respect to a datum line 31. The sightline is at 0° and coincident with 0° displacement of the yoke assembly from the datum position of yoke assembly in which the cables 17 and 17′ are unstressed.

FIG. 3 illustrates schematically positioning of the reflector 12 on the elevation axis 13. The reflector 12 is shown in a 'normal' orientation by full lines at an inclination α (say 45°) to the normal to the azimuth axis 22 to provide a sightline axis 30 which extends vertically along azimuth axis 22 and is deflected by the reflector 12 to the right of the elevation axis 13 to exit horizontally. The reflector 12 may be 'flipped' to the orientation shown by broken lines 12(a), that is, rotated about axis 13 to make an equal but opposite angle −α to the normal to the azimuth axis causing the sightline vertically along axis 22 to be deflected to the other side of the axis 13, as shown at 30′, the sightline having the same elevation but displaced 180° in azimuth.

It will be seen that orientation of the reflector about elevation axis 13 between corresponding angles ±α of any value causes diversion of the sightline to opposite sides of the elevation axis and displacement about the azimuth axis of 180°.

Considering this procedure in addition to azimuth rotation of the yoke assembly in FIG. 2, it will be appreciated that with the reflector in the 'normal' orientation the yoke assembly may be rotated clockwise by 180° between +90° and −90° to achieve coincident scanning of the sightline. If the reflector is 'flipped' to its alternative orientation and the yoke assembly simultaneously rapidly rotated anticlockwise by 180° the yoke assembly azimuth will be +90° and the sightline azimuth −90°, a further clockwise rotation of the yoke assembly between +90° and −90° causing the sightline to scan between −90° and +90° by way of the 180° position and completing a 360° scan.

Although the scan is interrupted by repositioning the reflector and yoke assembly, the sightline is caused to undergo a 360° rotation with only 180° azimuth rotation of the yoke assembly and less than 180° elevation rotation of the reflector.

It will be appreciated that any sightline azimuth may be defined requiring the yoke assembly to be positioned only within a sector defined by boundary points ±B=±90° from the datum position, and in general moving the existing sightline azimuth direction through an angle X°, say, to one demanded will involve yoke rotation of X° if in the same semi-circular region or (180°−X°) if the reflector is flipped.

Figure 4A:
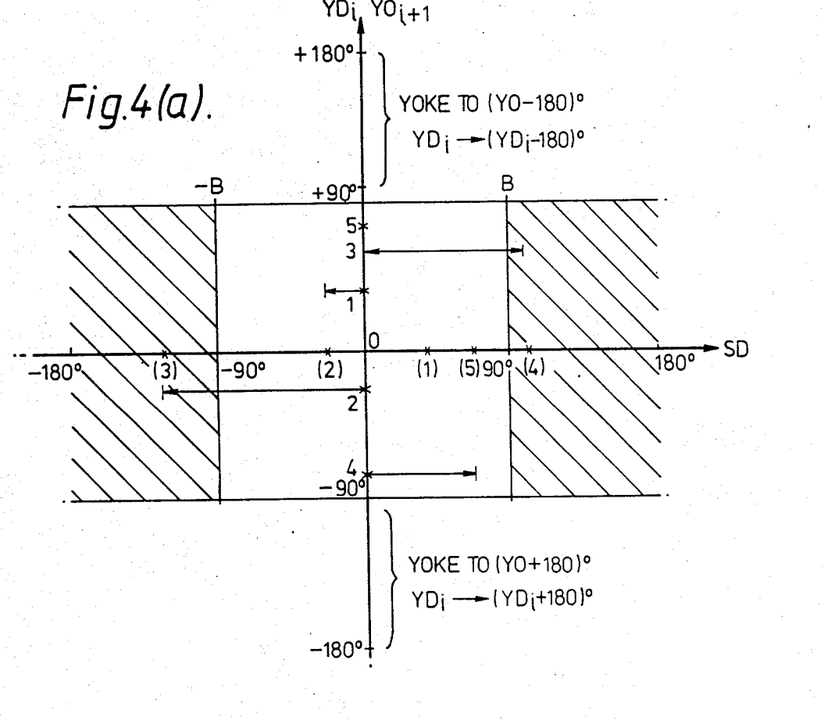
FIG. 4(a) is a chart showing relationship between originating and demanded sightline azimuth angles and originating yoke assembly azimuth angles employed and boundaries for determining when to achieve a sightline azimuth by moving the reflector relative to the yoke.

The procedure by which the decision is made as to orientation of reflector and yoke assembly may be explained and summarised with respect to the graphical representation of the chart FIG. 4(a).

In that figure the vertical axis YO represents the existing, or original, yoke assembly azimuth angle at the start of a move and the horizontal axis SD represents the demanded sightline azimuth orientation.

It is assumed that the demanded sightline azimuth SD can be at any angle between ±180° but if SD > ±B (i.e. ±90°) then the reflector must be in its flipped orientation, wherein a 'flip' factor F=1, whereas if SD < ±B the reflector must be in its normal orientation and F=0. The demanded yoke assembly azimuth YD may then be expressed as $$YD = SD + F.180 \qquad (0)$$

F being 0 or 1. It will also be appreciated that when the yoke assembly achieves a demanded yoke assembly azimuth for the ith positioning movement ($YD_i$) this becomes the yoke originating azimuth $YO_{i+1}$ for the next sightline positioning movement.

Operation may be exemplified by a sequence of five consecutive sightline movements from 0° to +40°, from +40° to −20°, from −20° to −120°, from −120° to +100° and from +100° to +75°, the chart showing at a glance whether the value of SD is in the unshaded portion and F=0 or in the shaded portion when F=1.

Figure 4B:
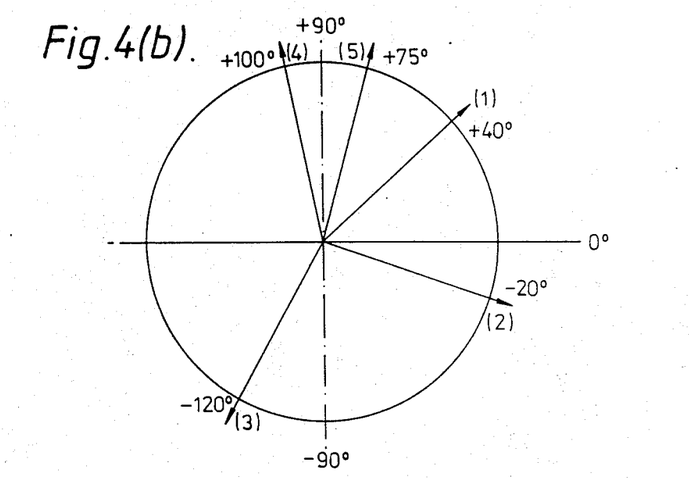
FIG. 4(b) is a schematic plan, similar to FIG. 2 showing examples of sightline and yoke assembly azimuth angles as achieved by the sighting system of FIG. 1 in a basic operating configuration.

Referring to FIGS. 4(a) and 4(b) it will be seen that a demanded sightline azimuth SD of +40° requires F=0 and the demanded yoke assembly azimuth is (40+0.180)=40° achieved by simple yoke assembly rotation of 40° to +40°. The yoke assembly azimuth becomes the YO for the next move and is plotted on the axis.

Move 2 has an SD of −20° and as F=0 is achieved without reflector flipping by rotating the yoke assembly to −20° through 60° equal to the sightline displaced.

Move 3 has an SD of −120° making F=1 (requiring the reflector to be flipped) and producing an effective YD of (−120+1.180)=+60°, achieved by yoke azimuth rotation of 80°, less than the 100° sightline displacement.

Move 4 has an SD of +100°. F is again =1 and the reflector remains in the flipped orientation, an effective YD of −80° being achieved by yoke rotation of 140° equal to the sightline displacement.

Move 5 has an SD of +75°. This puts F=0 and requires the reflector to be flipped to its normal orientation leading to a yoke rotation of 155°, considerably in excess of the 25° sightline displacement.

It will be readily appreciated that in some instances e.g. when performing panoramic tracking or redirecting the sightline as in move 3 above, a new sightline may often be achieved by yoke assembly rotation less than the resultant change in sightline azimuth.

However, it will be seen that in some instances, such as move 5 outlined above, setting the boundary points to constrain the yoke assembly to ±90° motion from the datum point and responding to a sightline move over the ±90° boundary by flipping of the reflector can sometimes increase the time taken to achieve a new sightline at small angular displacement in the vicinity of the yoke rotation boundary.

Preferably the simple criteria of flipping the reflector and offsetting the yoke azimuth by 180° for a demanded sightline greater than ±90°, from the datum point, that is, B=±90 are amended to utilise more fully the ability of the yoke assembly to rotate closer to the ±180° position.

Figure 5A:
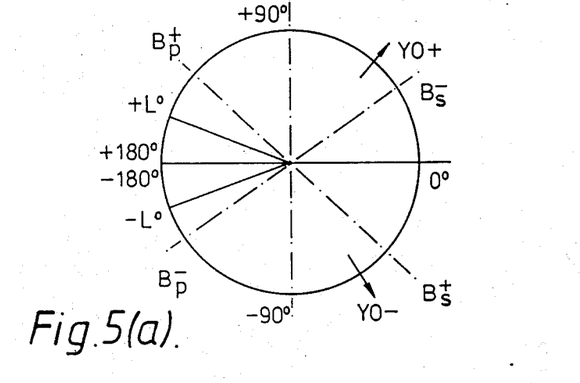
FIG. 5(a) is a schematic plan, similar to FIG. 2 showing limit points for the yoke assembly at azimuth angles greater than in the basic system and the defining of boundaries to yoke assembly rotation at which reflector rotation is effected.

Referring to FIG. 5(a) which is a schematic view in the azimuth plane similar to FIG. 2 showing permissible angular rotation from a 0° datum line, the sightline is of course directable through ±180° but the yoke assembly is rotatable through ±L° where L is the aforementioned limit point of yoke rotation between 90° and 180°.

The boundary points ±B for YDi may be set at ±L°. The the yoke assembly will have a rotational range between ±L° for the mirror in its normal orientation and between ±(180−L)° from the datum point for the mirror in its flipped orientation. It will be appreciated that the value of demanded sightline angle SD may be increased equally up to ±L° so that reflector flipping effectively occurs only when the sightline direction changes cross the limiting angles. This situation is in fact no more satisfactory as the yoke assembly will tend to rotate through larger angles between widely spaced sightline angles rather than take advantage of reduced yoke assembly travel associated with reflector flipping.

The boundary points ±B may of course be fixed at any angle intermediate 90° and L°, the smaller the value, the less available angular range of yoke assembly in rotation is used.

The system of the present invention may be operated to make more effective use of yoke assembly rotation beyond minimum 90° boundary points and re-orientation of the reflector to avoid excessively large yoke assembly rotation angles by arranging for the control means to monitor the yoke assembly and sightline angular positions with respect to the datum point. In one operating form of control means the control means determines the minimum angular separation of existing originating and demanded sightline directions and thus the yoke assembly rotation (SD−SO) required to a theoretical angular position to achieve the demanded sightline without re-orientating (flipping) the reflector and, having regard to the originating yoke assembly angle (YO), whether such rotation would cause the yoke assembly to cross one of the boundaries defined by boundary points ±B, that is if ((SD−SO)+YO>B).

If a boundary would not be crossed then the demanded sightline is achieved simply by yoke assembly rotation irrespective of the reflector orientation, whether it is in the normal or flipped orientation state. However, if a boundary would be encountered the yoke assembly is rotated to an angular position displaced 180° from the theoretical one and the reflector flipped to its alternative orientation state.

It will be seen that it is immaterial whether the sightline displacement crosses the boundary, only whether yoke assembly rotation to achieve it would do so.

For example, suppose the boundary B is at +140° and an initial sightline angle is 100°. The reflector remains in its 'normal' orientation and the yoke assembly takes an angle YO=100°. If the second demanded sightline angle is 150° then because this would involve the yoke assembly crossing the boundary the reflector is orientated to its 'flipped' state and the yoke assembly rotated to −30°. If the third demanded sightline angle is +80° then the theoretical yoke assembly angular position is given by (80−150)+(−30)=−100°. This does not exceed a boundary point and is achieved by rotation only of the yoke assembly and without flipping of the reflector orientation just because the sightline has crossed the boundary for yoke assembly rotation.

However while this method of operation avoids unnecessary re-orientation of the reflector or variations in sightline direction in the vicinity of the boundary points there are still conditions under which the yoke assembly undergoes excessive rotation. If, for example, the third demanded sightline above is +40° then this would be achieved by yoke assembly rotation through 110° to −140° rather than a shorter 70° which would have resulted from reflector rotation.

A preferred form of the invention employs the first described principle of always having the reflector in one particular orientation (normal) i.e. F=0 when the sightline direction angle is between the datum point and boundaries B and in the other orientation (flipped) i.e. F=1 when the sightline direction angle is beyond the boundaries. The boundary points however are arranged as principal and supplementary boundaries $B_p$ and $B_s$ 180° apart, a principal boundary $B_p$ being defined in the direction of the existing displacement of the yoke assembly from the datum point which is between 90° and L° and a function of the magnitude of the yoke assembly displacement, f(YO).

Referring to FIG. 5(a) it will be seen that according to the convention used herein, a positive originating yoke assembly angle YO+ provides a principal boundary $$B_p^+ = +90° + f(YO^+) \quad (1)$$

and displaced the other side of the datum point a corresponding supplementary boundary $$B_s^+ = -90° + f(YO^+) \quad (2)$$

For a negative originating yoke assembly angle YO− the principal boundary angle $$B_p^- = -90° - f(YO^-) \quad (3)$$

and supplementary boundary $$B_s^- = +90° - f(YO^-) \quad (4)$$

Thus considering equations (1) to (4) in terms of the magnitude of originating yoke assembly angle YO they may conveniently be expressed as $$B_p^\pm = \pm[90 + f(|YO|)]° \quad (5)$$

and $$B_s^\pm = \mp[90 + f(|YO|)]° \quad (6)$$

where the appropriate signs relate to the sense of rotation of YO from the datum point.

The function of YO may be a fraction β of the originating yoke assembly angle, that is, YO.β, where the fraction β may be a constant for the system, giving a linear relationship, and preferably comprises the proportion of the rotational range of the yoke assembly between the datum point and limit L° which is in excess of the minimum 90°, that is, $$\beta = (L - 90)/L \quad (7)$$

Equations (5) and (6) may then be expressed as, $$B_p^\pm = \pm[90 + YO\cdot(L-90)/L]° \quad (8)$$

and $$B_s^\pm = \mp[90 + YO\cdot(L-90)/L]° \quad (9)$$

Figure 5B:
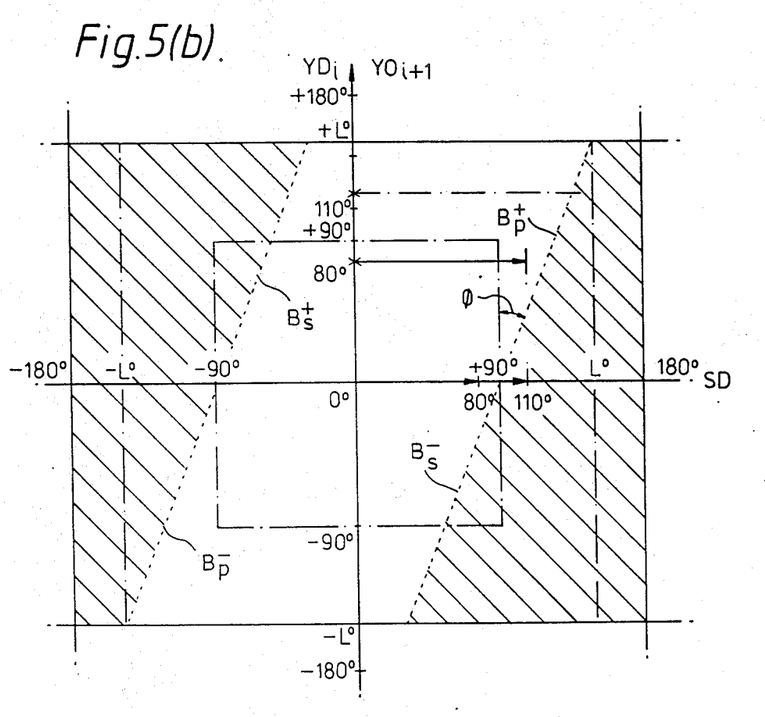
FIG. 5(b) is a chart similar to FIG. 4(a) showing the relationship between demanded sightline azimuth angles and originating yoke assembly azimuth angles modified to accommodate the limit points of yoke assembly greater than ±90° and boundaries which vary with originating yoke assembly azimuth angles.

These relationships may be better appreciated by reference to the chart of FIG. 5(b) which is drawn on the same basis as that of FIG. 4(a) described above. The vertical axis shows the demanded yoke angle for the ith move (YD$_i$) which is also the originating yoke angle YO$_{i+1}$ for the (i+1)th move and the horizontal axis the demanded sightline angle (SD). The shaded regions beyond the boundary lines require the flip factor F=1 and the unshaded regions F=0.

The demanded yoke assembly and sightline angles now extend to a maximum of ±L° and the demanded sightline boundaries $B_p^\pm$ and $B_s^\pm$ at which reflector flip occurs are shown. $B_p^+$ varies from +90° for YD$_i$=0 to +L° for YD$_i$=+L°, while $B_s^+$ varies from −90° for YD$_i$=0° to −(180−L)° for YD$_i$=+L°. Similarly $B_p^-$ varies from −90° for YD$_i$=0° to −L° for YD$_i$=−L° and $B_s^-$ varies from +90° for YD$_i$=0° to +(180−L)° for YD$_i$=−L°. The effect is best illustrated by example. Supposing a first move involves an SD of 110° (from 0°) then as this exceeds the boundary value $B_p^+$, F=1 the reflector flips and from the equation (0) YD$_i$ becomes (SD+1.180)=−70° requiring yoke assembly rotation of only 70°. Consider now the case when the first move (from 0°) involves an SD of 80° then as the boundary $B_p^+$ is not crossed F=0 and the yoke assembly rotates through 80°, the reflector in its normal orientation. If a second move demands an SD of 110° then from the YD$_{i+1}$ position of 80° the SD of 110° does not cross the boundary $B_p^+$ and the second move takes place by rotation of the yoke assembly through a further 30°.

It will be appreciated that by this means relatively small displacements of sightline are less likely to require large yoke assembly rotations accompanied by reflector flip enabling the yoke assembly to make full use of its ability to rotate up to angle L°.

It will also be appreciated that over-long rotations due to a slightline demand in the opposite rotational direction or with the yoke assembly displaced in the opposite direction are avoided by defining the boundaries $B_s^\pm$ and $B_p^-$ shown in the corresponding quadrants of FIG. 5(b).

Relationships may be derived in order to implement the decision of whether for any value of YO$_{i+1}$ the demanded value of SD exceeds the boundary.

Assuming an originating yoke assembly angle in a positive rotational sense in FIG. 5(a) then the decision on whether the reflector should be orientated to its flipped state depends on the relationships $SD > B_p^+$ and $SD < B_s^+$, that is, $$SD - B_p^+ > 0 \text{ and} \quad (10)$$

$$SD - B_s^+ < 0 \quad (11)$$

which expanding in accordance with equations (8) and (9) become $(SD-90) - YO \cdot (L-90)/L > 0$, and $(SD+90) - YO \cdot (L-90)/L < 0$. Thus $F=1$ if $$L \cdot (SD-90) - YO \cdot (L-90) \text{ is positive} \quad (12)$$

or if $$L \cdot (SD+90) - YO \cdot (L-90) \text{ is negative} \quad (13)$$

The decision on whether to satisfy a demand for a new sightline by simple rotation of the yoke assembly or by a combined reflector flip and modified rotation of the yoke assembly and reduced to the two conditions of equations (12) and (13) is readily performed by conventional digital processing means, conveniently in the form of a microprocessor programmed with stored values of $\pm L$ and operable to monitor the existing or originating yoke assembly angle YO and in response to a sightline demand SD perform the conditional tests.

As stated, the present invention provides benefits not only in terms of extending the range of sightline azimuth directability where the yoke assembly is of limited in travel but also enables the control means to be operated to optimise sightline acquisition by defining boundaries at which the reflector is reorientated by flipping.

This reflector orientation as a function of boundaries defined by the control means is applicable also to a system construction in which the yoke assembly is not limited in azimuth rotation. In such a situation the boundary points are not a function of limit points L and may be understood qualitatively with reference to FIG. 2 by appreciating that whatever the current, or originating, sightline azimuth direction, as defined by the values YO and F a demanded sightline of $< \pm 90°$ from SO is most rapidly achieved by rotation of the yoke assembly with the reflector orientation factor F unchanged whereas if the demanded sightline is $> \pm 90°$ from SO this is most rapidly achieved by flipping the reflector and rotating the yoke assembly to the supplement of the demanded sightline angle.

This may be expressed more formally using the convention of the equations (8) and (9) above as $$B_p^{\pm} = YO \pm 90 \quad (14)$$

$$B_s^{\pm} = YO \mp 90 \quad (15)$$

and in accordance with equations (12) and (13), $F=1$ if $$SD - 90 - YO > 0 \quad (16)$$

or if $$SD + 90 - YO < 0 \quad (17)$$

Having determined whether $F=0$ or 1 the effective demanded yoke assembly angle is still given by equation (0), that is, $YD = SD + F \cdot 180$.

Figure 5C:
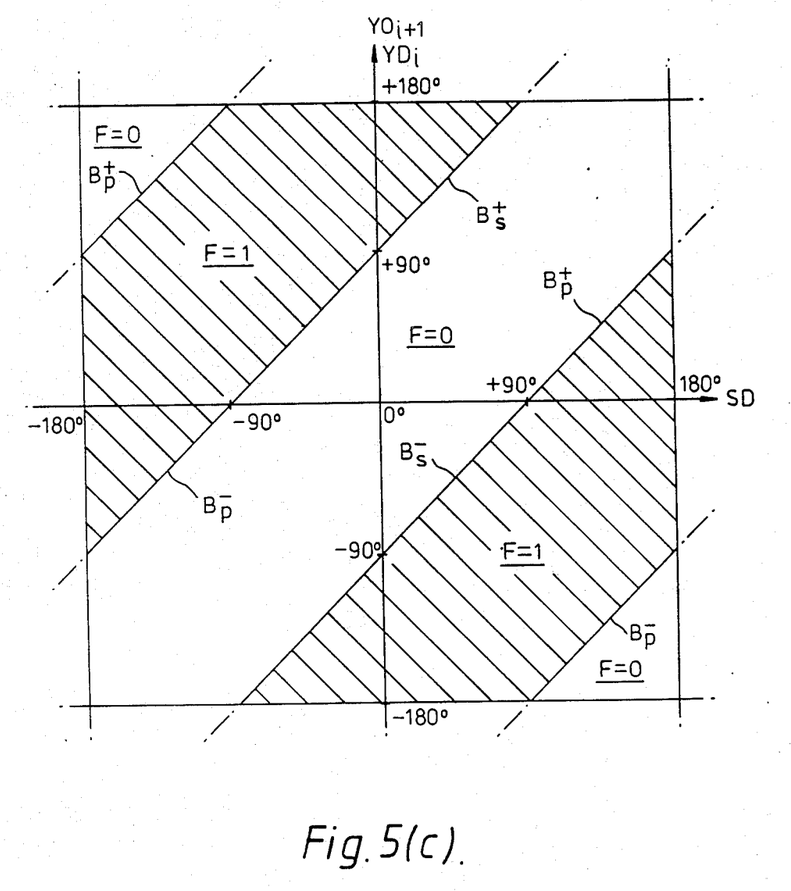
FIG. 5(c) is a chart similar to FIG. 5(b) showing the relationship between demanded sightline azimuth angles and originating yoke assembly angles to optimise demanded sightline achievement when there are no limit points for rotation of yoke assembly.

Those relationships may be expressed graphically in the chart of FIG. 5(c), which is similar in principle and nomenclature to FIG. 5(b) discussed above. It will be seen that the permitted angle of yoke assembly extends from the datum point 0° in both senses to 180° and the unshaded regions represent conditions when $F=0$ and shaded region conditions when $F=1$.

Figure 6:
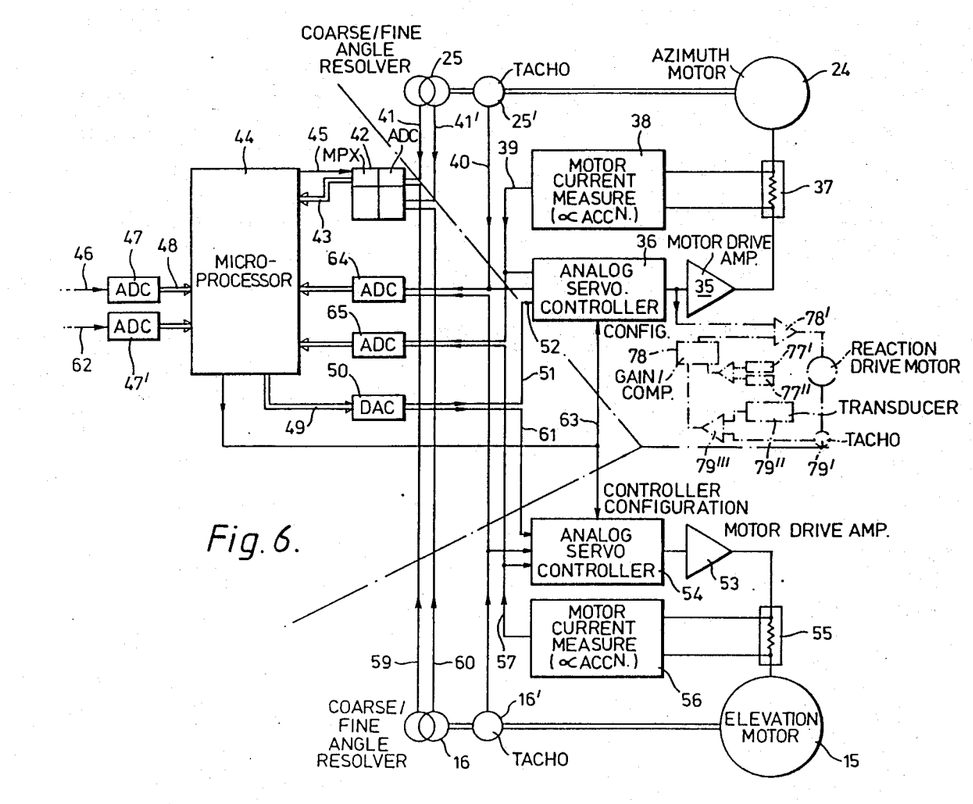
FIG. 6 is a block circuit diagram of the control circuitry involved in achieving a demanded sightline direction.

Having described the method by which the sighting system functions, reference is now made to FIG. 6 which shows in block form the control means by which the rotational positions of the yoke assembly and reflector about their axes are determined and achieved.

The azimuth and elevation motors 24 and 15 essentially have identical control circuitry configuration and to simplify the description it is mainly confined to references to the azimuth motor.

The azimuth motor 24 is a d.c. torque motor supplied with drive current by a motor drive means, such as an amplifier 35, under the control of an analog servo control circuit 36 containing conventional components having proportional and/or integrating and/or differentiating transfer functions as is well known in the art but switchable as to which transfer function characteristics are employed at any time.

The current supply from amplifier 35 to the motor is fed by way of low value resistance element 37, across which are connected input leads to an acceleration sensing transducer in the form of voltage sensing means 38, such as a differential input voltage amplifier, which produces an output signal on line 39 proportional to the current supplied to the motor and thus the torque developed by, and angular acceleration of, the motor.

The tachometer 25' produces a signal on line 40 proportional to the rotation rate of the motor.

The angle resolver 25 comprises a high accuracy synchro with dual windings giving 1 speed (coarse, low accuracy) and 36 speed (fine, high accuracy) outputs on lines 41, 41' connected to separate input channels of a multiplexer/analog-to-digital converter (ADC) 42. The multiplexer/ADC produces digitized motor angle signals on bus 43 connected to an input of digital processing means, conveniently a microprocessor 44, multiplexing signals for switching between channels being provided on a line 45 from the microprocessor.

The microprocessor is of conventional design requiring no further or more specific description and has stored in the storage medium thereof a program through which the CPU processes received signals representing the above discussed angular values in accordance with the above derived relationships and normal servo control relationships.

The microprocessor is programmed to function in a number of output modes in which it produces configuration signals to determine the configuration, that is, the principal transfer function characteristic, of the analog servo controller and in which the processed signals output represent a particular form in relation to the configuration of the servo controller.

More particularly the servo controller (and system) may be configured by the microprocessor to function in an angular position, velocity, or acceleration feedback mode depending on the principal controlled variable.

In an angular position feedback mode a sightline azimuth demand signal is applied on line 46 e.g. by manual adjustment of a potentiometer voltage or as an output of other equipment such as tracking radar, to an ADC 47 and thence by input bus 48 to an input port of the microprocessor. An output bus 49 connected to an output port of the microprocessor provides processed signals to a digital-to-analog converter (DAC) 50, analog output signals of which are connected by line 51 to an input terminal 52 of the servo controller 36.

The processed signals represent an angular position error, resulting from a difference between the instantaneous measured and demanded angular position, and the analog servo controller 36 is arranged, when configured in an angular position feedback mode, to pass the error signals from input terminal 52 to the motor drive amplifier 35 either directly, without modification, or by way of a constant transfer function device such as an amplifier or attenuator.

It will be seen that the microprocessor is readily able to perform a number of additional functions, the principal one being the decision as the whether a demanded sightline requires the reflector to be flipped and the yoke assembly angle to be offset and to this end comprises digital processing means associated with both functions.

In accordance with the equations (12) and (13) above the microprocessor compares the input sightline demand signal (=SD) and the current, or originating, yoke assembly angle (=YO) and evaluates YD i.e. the actual position which will be demanded of the yoke assembly, and whether the reflector is to be in its 'normal' or 'flipped' orientation i.e. whether F=0 or 1. The value of YD becomes the effective azimuth servo demand signal which is compared with the measured angle YO and the difference forms the servo angular position error signal.

It will be appreciated from the above that the azimuth positioning is not truely divorced from the reflector elevation positioning and the microprocessor 44 with its associated ADC's and DAC is employed commonly in both motor systems.

The elevation motor 15 is also a d.c. torque motor driven by current from a drive amplifier 53 under the control of analog servo controller 54. The motor current is also passed by way of a resistance element 55 coupled to voltage sensing means 56 which provides what is effectively an acceleration feedback circuit on line 57 to the servo controller 54. The tachometer 16', similar to that 25', provides a rotation rate feedback signal on line 58 to the analog servo controller 54 and angle resolver 16, corresponding to 25, provides coarse and fine angle-related output signals on lines 59, 60 to the multiplexer/ADC 42. DAC 50 has a second analog output line 61 connected to the servo controller 54 by which elevation position error signals are applied to control the motor.

An elevation demand signal is applied on line 62 to ADC 47 and is processed with the azimuth demand signals by comparison with the angle sensor signals to provide the elevation error signal. It will be appreciated that if as part of the azimuth axis processing F becomes 0 or 1 (at elevation angle $\alpha$) this is readily accomplished by adding to, or subtracting from, the feedback signal from angle resolver 16 the equivalent of an offset of $2\alpha°$.

In the velocity feedback mode the analog servo controller is configured by configuration signals from the microprocessor on line 63 to operate switching means (not shown) therein such that the signal from the tacho 25' is fed via a feedback network having a desired transfer function, e.g., in respect of phase adjustments, to an error measuring junction in which the signals are compared with those output from microprocessor 44 and applied to the controller by way of input 52. The resultant signal difference represents a velocity error signal which is output by the controller to the motor drive amplifier 35.

In the acceleration feedback mode the switching means responds to the configuration signals to apply acceleration signals from the transducer 38 by way of suitable feedback network to a error measuring junction to which the signals received from microprocessor 44 at input 52, and representing an acceleration demand, are also applied, the resultant acceleration error signal forming the output of the controller.

For example, the sightline may be caused to track at a demanded rotation rate, the microprocessor 44 providing a rate demand signal, by way of DAC 50 to input 52, the servo controller deriving from this and the tacho signal a rate error signal which is applied to motor drive amplifier 35.

Preferably however for tracking at a demanded input rate of rotation the control means is configured in the angular position feedback servo mode, the microprocessor 44 continually receiving sampled digital angular position signals and comprising each with the previous sample to produce an angular position error signal for application to the motor. The microprocessor in response to the demanded rotation rate, offsets one of the samples in accordance with the demanded rotation rate, that is, either increments each of said previous samples or decrements the current position sample, before comparison so that the error sample is constantly offset at the rotation rate which the servo loop attempts to eliminate by constantly incrementing the position of the motor. It has been found that this form of tracking rate control is extremely accurate at very low velocities, e.g. several degrees/hour, at which the signals from a conventional tachometer cannot be relied on.

To complete the interrelationship between the microprocessor and analog servo controllers the velocity and acceleration signals being used as, or in determination of, appropriate demand signals the analog outputs of tachos 25' and 16' are applied by way of an ADC 64 to the microprocessor input port and the analog outputs of motor current (acceleration) measuring devices 38 and 56 are also applied by way of an ADC 65.

As well as servo control being either completely analog or digital for the whole of a response interval as in the example of the rate feedback servo described, the servo controller may be configured by the microprocessor advantageously for predetermined or computed portions of a response interval.

It is an inherent feature of the sighting system that the changes in angular position may be relatively large (up to 180°) or extremely small and required to be produced with speed and precision. In conventional position feedback servo systems there is a conflict caused by the damping response of the systems. To achieve a large displacement quickly an underdamped system is required but this leads to increased settling times at all positions and may introduce stability problems, particularly as in the present case where the support member is for visibility purposes carried by the flimsiest of supports.

Operation of the system in response to a demanded azimuth angular position of the yoke assembly will now be considered. The input signal at 46 is a position demand and the microprocessor 44 enters an angular position feedback mode of operation.

Initially a decision is made as described above on whether to reorientate, or 'flip', the reflector as this determines the effective angular position demand signal as outlined above.

The feedback signals from angle resolver 25 are compared with the effective demand signal in digital form in the microprocessor 44 to produce a position error signal therein which is analog form is applied to, and passed by, the controller 36 to the motor drive amplifier.

The microprocessor 44 is programmed however such that when the effective displacement demanded of the yoke assembly (YD−YO) is determined the magnitude is compared with a predetermined threshold limit. If it is below the threshold, the yoke assembly is positioned as described above using feedback from the angle resolver 25. If it is above the threshold the microprocessor establishes a 'fast slew' mode. The microprocessor 44 produces a configuration signal to switch the servo controller to an acceleration feedback servo configuration and produces to input 52 thereof an acceleration demand signal. This may be preset, being a known fraction of the maximum acceleration of the drive motor. If the maximum is not known an output in excess of possible maximum may be provided initially to saturate the drive amplifier and the actual maximum achievable received from the means 38. The analog servo controller 36 configured as an acceleration feedback servo responds to feedback signals from the measuring device 38 to drive the azimuth motor 24 exerting a predetermined torque towards the demanded position. The instantaneous angular position as provided by angle resolver 25 is monitored and when the angular position error has been reduced by a preset fraction, say one half, the microprocessor causes an acceleration demand signal to be produced whereby the drive current to the motor is reversed to decelerate the motor.

The microprocessor continuously monitors the magnitude of the remaining rotational distance and the rate of rotation and provides at its output port, and subsequently at controller input 52, an acceleration demand signal which decreases at such a rate that the motor will be brought to rest at the demanded angle. The deceleration rate ($d\omega/dt$) is determined from the motion equation $(d\omega/dt) = -\omega^2/(2 \cdot \epsilon)$ where $\epsilon$ is the angular displacement error.

The microprocessor may be programmed with the further step of configuring the servo controller to the angular position feedback mode when the remaining distance has been reduced below said threshold level, thereby optimising its response over the final and slower part of the motion.

The above described 'fast slew' and other motor control modes, whilst particularly applicable to the positioning the yoke assembly about the azimuth axis are equally applicable to establishing the orientation of the reflector about the elevation axis.

The remaining items shown in FIG. 1 but not described above form the subjects of copending applications but for completeness will be briefly described insofar as they are applicable to the sighting system of the present invention.

As the sighting system of the present invention is intended to rotate the yoke assembly rapidly the elevation and azimuth motors need to be powerful requiring the yoke assembly construction to be robust. It will be seen that the yoke assembly may readily have a large moment of inertia about the azimuth axis and the torque required from motor 24 to accelerate the yoke assembly causes an equivalent reaction torque in the support plate about the azimuth axis.

By contrast, the legs have minimal dimensions in the direction of yoke assembly rotation and are subject to deformation by the reaction torque transmitted through the support member 21 during acceleration and deceleration of the yoke assembly, this being particularly true in the 'fast slew' mode of operation described.

Reaction force compensation means, in this case torque reaction means, is shown generally at 70 in FIG. 1 and comprises a reaction member, or flywheel, 71 supported on the support member 21 by bearings 72 coaxially with the yoke assembly for rotation about the azimuth axis 22. A peripheral face 73 is toothed and meshes with a pinion 74 forming a drive member carried by a rotatable shaft 75 of reaction motor 76 fixed to the support member 21 with its rotational axis 76' parallel to, but displaced from, the azimuth axis 22.

The reaction member 71 has a moment of inertia about axis 22 larger than that of the yoke assembly and is rotated at a slower rate by reaction motor 76 by way of the single stage step-down gearing such that the reaction motor rotates in the opposite sense at a higher speed than the reaction member, the ratio being chosen as near as is practicable to that offering maximum reaction for minimum energy input to the motor.

Considering now the rotational motions of the yoke assembly and the reaction member, it will be appreciated that to counter the reaction torque produced in the support member 21 about axis 22, the reaction member must be accelerated about the axis 22 in the opposite rotational sense in synchronism therewith such that the reaction torque exerted by the reaction compensation means, the combination of reaction member and the drive motor, is equal in magnitude to the drive torque provided by the yoke assembly motor 24.

Considering initially that the reaction compensation torque is provided solely by the reaction member, it will be appreciated that the yoke assembly in rotating has an angular momentum $J_Y = I_Y \cdot \omega_Y$, where $I_Y$ is the moment of inertia of the yoke assembly about the axis 22 and $\omega_Y$ its angular velocity, and a drive torque $T_Y$, given by the rate of angular momentum $d(J_Y)/dt = t_Y = I_Y \cdot d\omega_Y/dt$.

Similarly it will be seen that for the reaction member 71, the angular momentum $J_R = I_R \cdot \omega_R$ and its rate of change, $T_R = I_R \cdot d\omega_R/dt$.

As stated, the principle of operation is that the reaction torques, or rates of change of momentum inducing them, must balance so that $$d\omega_R/dt = (I_Y/I_R) \cdot d\omega_Y/dt$$

As $I_Y < I_R$ by choice then $d\omega_R/dt < d\omega_Y/dt$ in the same ratio, and after any time t in motion from rest $\omega_R < \omega_Y$ in the same ratio.

Considering the mechanical power input to achieve the rotation, this may be expressed as (torque.angular velocity).

For the yoke assembly this is $T_Y \cdot \omega_Y$ and for the reaction member, $T_R \cdot \omega_R$ and given the above conditions that $T_R = T_Y$ and $\omega_R < \omega_Y$ it will be seen that the mechanical power required to accelerate the reaction member is $\omega_R/\omega_Y$ or $I_Y/I_R$ times the power required to rotate the yoke assembly, $I_Y$, of course, being less than $I_R$.

It will be appreciated that the reaction motor 76 has to provide less mechanical power than the yoke assembly drive motor 24 and consequently may be made a smaller electrical component of lower electrical power rating.

However it will be further appreciated that the motion of the reaction compensation means 70 includes rotation of the reaction motor 76 (including the drive member 74) in the opposite direction to the reaction member 71 and the angular momentum of the reaction member reduces the effective angular momentum of the reaction member in producing the reaction torque.

Because the motor and reaction member axes are parallel it does not matter that the angular momentum of the reaction compensation means is divided between the two members rather than concentrated into a single member as the torque is still effected by the rate of change of their combined angular momenta.

It is known that where an electric motor accelerates itself and a load (such as the reaction member) by way of intermediate gearing of ratio n the motor torque $T_M$ accelerates both motor inertia $I_M$ and load inertia $I_L$. The torque referred to the load is $n \cdot T_M$ and the total moment of inertia (referred to the load) $I = I_L + n^2 \cdot I_M$ so that the acceleration of the load is $$d\omega_L/dt = T/I = n \cdot T_M/(I_L + n^2 \cdot I_M) \qquad (18)$$

The power delivered to the load is a maximum if the load acceleration is a maximum. By differentiating the expression for $d\omega_L/dt$ with respect to n and equating to zero, a maximum value may be established for $n = (I_L/I_M)^{0.5}$.

When such a motor and load accelerate equal and opposite reaction torques are generated in the structure. The reaction torque due to the motor is given by $$d(\omega_M \cdot I_M) = n \cdot I_M \cdot d\omega_L/dt,$$

referred again to the load, and the reaction torque due to the load given by $I_L d\omega_L/dt$.

The total reaction torque is therefore $$(I_L + n \cdot I_M) \cdot d\omega_L/dt \qquad (19)$$

using the above expression (18) for $d\omega_L/dt$ in expression (19), the total reaction torque is given by $$T = (I_L + n \cdot I_M) \cdot n \cdot T_M/(I_L + n^2 \cdot I_M)$$

Differentiating this with respect to n to obtain a maximum gives $$n^2 - 2n - I_L/I_M = 0$$

or $$n = 1 \pm [(I_L/I_M) + 1]^{0.5}.$$

As the single stage of gearing introduces a direction reversal this produces a solution for the optimum value of $$n = [(I_L/I_M) + 1]^{0.5} - 1.$$

In the present apparatus the reaction member comprises the load such that $I_L = I_{R'}$ and the optimum value of n is given by $n = [(I_{R'}/I_M) + 1]^{0.5} - 1$.

It will be seen that this is somewhat smaller than suggested by the simple relationship but as the moment of inertia of the reaction member is increased with respect to that of the drive motor, the expression becomes closer to the simple relationship. It is found in practice that the transmitted power varies with gear ratio apply slowly a wide range of values of n so that it may be that value for n may be chosen which is substantially optimum while apparently being a long way from the theoretically optimum value. In any event, by the use of a suitable ratio, corresponding to, or near, the optimum value the energy requirements of the reaction motor 76 can be minimised.

It will be appreciated that the drive motor may be coupled to the reaction member by way of coupling means comprising intermediate gearing, the angular momentum of which is taken into consideration. For a single intermediate gear which would rotate in an opposite sense to the drive motor and reaction member, which now rotate in th same sense, the effective moment of inertia $I_R$ comprises $$(I_{R'} + n_m \cdot I_M - n_G \cdot I_G),$$

where $I_G$ is the moment of inertia of the intermediate gear and $n_G$ and $n_M$ are the gear ratios of the gear and drive motor relative to the reaction member, and from which an optimum value of gear ratios n can be determined, although an optimum ratio will generally be higher than for the single step drive considered above.

It will be appreciated that there are practical considerations in respect of the gearing ratio and possibly on the dimensions and rotational rates of the reaction components but a gear ratio of the same order of magnitude as the optimum n should be achievable.

The coupling between the reaction motor pinion and reaction member may be other than meshing teeth, such as frictional contact, and engagement may be other than by an outer peripheral wall with the engagement plane parallel to the azimuth and reaction motor axes.

The reaction motor 74 may also differ from that shown. The reaction motor may be formed coaxially with the yoke shaft 19 and azimuth axis 22 and by means of suitable reduction gearing drive the reaction member by coupling to, or adjacent to, the inner peripheral wall of the reaction member. Alternatively, or in addition, the reaction member may be rotatable about an axis displaced from, but parallel to, the azimuth axis 22 rather than coaxially with it.

The torque reaction balancing system thus far described is an 'open loop' system in that the current applied to reaction motor 76 is a constant fraction of that applied to the yoke drive motor 24, being a function of the relative inertial masses of the reaction balancing system and the yoke assembly.

If desired account may be taken of mechanical or environmental imperfections of the arrangement by forming a closed loop control system.

In the sighting system of FIG. 1 described above it is desired to eliminate any relative rotation between the annular base member 17 and the support member 21 about azimuth axis 22.

A simple feedback control loop may be provided by measuring such relative movement and modifying the current supplied to the reaction motor 76.

It will be appreciated that many forms of such measuring apparatus exist although not all may be suitable. For instance, in detecting relative motion displacement sensors are more attractive than rate sensors but can give rise to noise and loop stability problems. Furthermore care is required in introducing integral action into the control loop as this can lead to a non-zero output in a quiescent state with undesirable rotation of the motor. The availability of suitable sensors may further be limited by the need to avoid any obscuration of the sightline. In this respect the sensors may advantageously measure the motion of each member with respect to inertial space, the relative motion being derived from the individual measurements. Suitable forms of sensors which may be used are rate gyros or rate integrating gyros connected to give a rate output.

A schematic block diagram of such a control loop is shown by the broken lines in FIG. 6, transducers 77' and 77" being coupled to the base member 17 and support member 21 respectively. Their outputs are combined and to give a signal representing relative rotation of the members which signal then applied to gain and compensation circuitry at 78 before being added as an input to a motor drive amplifier 78' to modify the reaction motor drive current, received from the controller 36 of the yoke drive motor, and which comprises a feedforward signal for the control loop.

In an alternative form of closed loop control, shown by the additional chain dotted lines in FIG. 2, an additional transducer, such as a tachogenerator 79' is employed to measure the rotation rate of the reaction member 71 and an angle transducer 79", such as an electro-optical displacement sensor, is used to measure the relative angular displacement of base member 17 and support member 21. The displacement and reaction member rotation rate signals are combined with each other at 79''' and, via the gain and compensation circuitry 78, combined in turn with the feedforward signal from the yoke drive motor controller 36 in amplifier 78'.

As stated above the limit points may not physically prevent the yoke assembly from rotation beyond them but represent, at least, the limits of safe rotation by means of the drive motor.

Azimuth rotation of the yoke assembly will normally be limited to the above defined limits of $\pm L°$ by the microprocessor controlled position feedback servo operation. An additional safeguard to avoid excessive rotation may be provided by overtravel prevention means.

Figure 7:
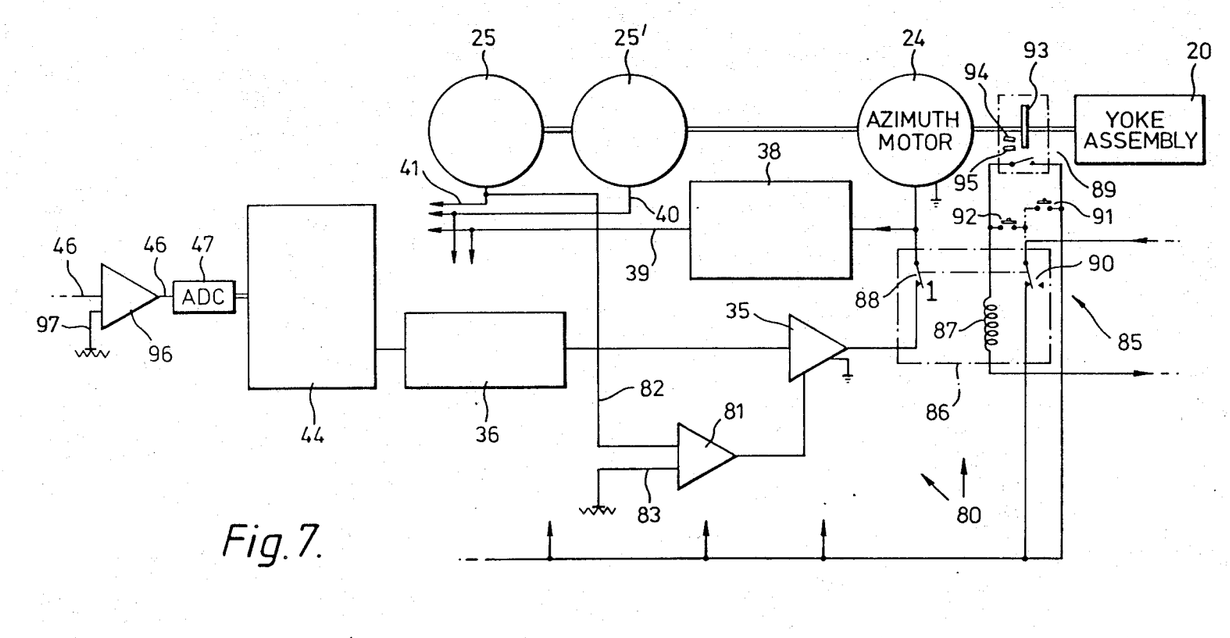
FIG. 7 is a simplified form of the control circuit of FIG. 6 showing overtravel prevention means.

Referring to FIG. 7 this shows the part of sighting system of FIG. 6 relating to motion of the yoke assembly but in simplified form. Corresponding parts are given like reference numerals and in addition thereto overtravel prevention means is shown at 80.

The overtravel prevention means functions in relation to the shaft angular position limit at $\pm L°$ from the datum shaft angular position (0°).

Adjacent the limit point L° a margin region is defined extending from a margin edge at M° from the datum point to L°.

The magnitude of feedback signals produced by angular position transducer means 25 for shaft rotation to the margin edge and limit points are pe-determined and the overtravel prevention means comprises comparison means 81 arranged to receive on line 82 the istantaneous shaft angular position signals from transducer 25 and on line 83 a reference signal representative of the margin edge.

The comparison means 81 is arranged to produce a signal on line 54 when the shaft angular position exceeds the margin edge having a magnitude related to the displacement of the instantaneous shaft angular position from the limit point, said signal being applied to control the gain of the motor drive amplifier 35 to reduce the servo gain of the system for rotation within the margin to a minimum at the limit point.

The overtravel prevention means also includes position limiting means 85 comprising relay means 86 including an energising coil 87 and switching contacts 88. The contacts 88 represent a single pole double throw switch connected in the supply line from the motor drive amplifier 35 to one terminal of motor 24, the other input terminal being grounded, such that when the relay coil is energised the motor supply terminal is connected to the drive amplifier to receive drive current and when the relay coil is de-energised the motor supply terminal is grounded, thereby effectively short-circuiting the motor supply terminals.

The energisation of the relay coil 87 is controlled by limit switching means 89 operated by rotation of the shaft to the angular position L from the datum position, the limit switching means permitting the relay coil to be energised only if the shaft is between the datum and limit points, de-energised if the motor drives the shaft to the limit point and inhibited from energisation if at, or beyond, the limit point.

Thus in operation if a shaft angular position is demanded which causes the motor to (attempt to) rotate beyond the limit point the servo gain is progressively reduced after it crosses the margin edge until at the limiting point there is no drive current to rotate it further and it is halted. If, however, the reduction in drive amplifier gain fails to remove the motor current at the shaft angular limit position L and/or the inertia of the yoke assembly continues to rotate the shaft the limit switching means 89 de-energises the relay coil 87 and contacts 88 are operated, removing drive current from the motor and short circuiting the input terminals, thereby applying rheostatic, or resistive, braking to the motor and bringing it rapidly to a halt.

The relay means 85 may be provided with a second set of contacts 90 operated with the contacts 88 to interrupt the power supplies to the drive amplifier, the analog servo controller 36 and to the relay coil 87 by way of limit switching means 89 inhibiting initial or further operation of the system until the motor shaft is rotated to close the circuit through the limit switching means.

A reset switch 91 may be provided across the further contacts 90 to enable the relay coil to be energised after the motor shaft has been manually rotated to within the limiting position or a reset switch 92 may be provided across both the further contacts 90 and the limit switching means 89 and coupled with means (not shown) for applying a 0° position demand signal to the input of microprocessor 44, whereby the shaft position is restored to the datum position before subsequent operation.

The limit switching means 89 is shown also in FIG. 1. It comprises a shutter 93 carried by the shaft 19 of the yoke assembly 20. The support plate 21 carries a source 94 of optical radiation, operable to emit a beam of radiation towards the shutter, and a receiver 95 of the radiation received only by way of reflection from the shutter, the receipt of radiation causing effective closure of switch 89. The shutter 93 is apertured or has a non-reflective surface at a position or positions corresponding to angular rotation of the shaft beyond the limit point L° from the datum position whereby the radiation is not reflected nor received and the switch effectively opened.

It will be appreciated that the position limiting means is inherently of a fail-safe nature, any failure of the relay means to energise causing the motor drive current to be removed accompanied by motor braking and any failure of components of the limit switching means preventing reception of the beam causing the de-energisation of the relay means.

In addition to the component parts described above the overtravel prevention means may include further comparison means shown at 96 in FIG. 7 operable to compare the value of the position demand input signal on input line 46 with a reference signal on line 97 the magnitude of which represents the demand signal value corresponding to the angular limit point.

The further comparison means is operable to compare applied angular position demand signals with the reference and apply demand signals less than the reference value unchanged to the input means.

However, it responds to a demand signal value in excess thereof to limit the output of the further comparison means to the reference value such that a demand signal in excess of that demanding the angular limit position is never received by the input means.

Alternatively the response to a demand signal value in excess of the reference may cause a warning to be given and the demand signal rejected.

The above described arrangement of overtravel prevention means has comparison means 51 which responds to an instantaneous shaft angular position within a margin defined by a fixed predetermined margin edge M. It will be appreciated that the extent of the margin must be chosen to be effective for the yoke assembly travelling at maximum angular velocity and that at lower velocities it may be too extensive and interfere with rapid servo response in the margin.

The reference signal on line 83 defining the margin edge may be provided as a function of the angular velocity of the shaft, either measured by velocity feedback transducer 25' or by differentation of the angular position signals from transducer 25, so that the margin is reduced in extent at lower shaft angular velocities.

Furthermore it will be appreciated that although the overtravel prevention device functions as part of comparison with instantaneous shaft position and a limiting position and is operated to move the shaft between demanded angular positions the motion of the system may at any time be a function of other feedback variables such as velocity or acceleration, for example in the 'fast slew' mode.

Whilst the use of a microprocessor 44 enables determination of an effective demanded yoke assembly azimuth position and precise position control over a wide range of position and velocity demands, such computer circuitry is more susceptible to software errors or 'glitches' caused by extraneous electrical or radiation interference and the provision of several stages of insurance against overtravel is particularly advantageous.

The microprocessor 44 may also be employed in a self-checking routine operable to prevent energisation of the relay means, either initially or to de-energise it, if the processor is not functioning correctly, for instance due to a microprocessor software error which could accept or cause a demanded yoke supply position beyond the limit points ±L.

It will be appreciated that the comparison and further comparison means 81 and 96 respectively may be implemented in a form other than the analog comparators shown and their functions may be incorporated as program steps in the microprocessor 44 providing at least the position limiting means is operated independently of the microprocessor and safe from any potential failure thereof. A suitable output signal is provided by the microprocessor to control the gain of amplifier 35 or instead, the magnitude of the position error or demand signal being output to analog servo controller 36.

Clearly the limit switching means may take any other non-contact-or contact-making form, such as a microswitch actuated by a cam on the yoke shaft 19.

The above described method of forming overtravel prevention means is preferred to a mechanical buffer assembly, particularly where the inertia of the yoke assembly is large and it is driven at high speed. Such overtravel prevention means may also be associated with the reflector assembly although in general the smaller dimensions and inertia thereof would make a mechanical buffer satisfactory. The use of a mechanical buffer with the reflector assembly may also include relay means responsive to the detection of increased motor drive current, when against the buffer to remove the source of drive current.

A further feature of the system relates to the construction of reflector 12. In one embodiment the sighting system is required to receive infra-red radiation by way of a relatively wide optical aperture from a rapid sequence of elevation angles.

The plane reflector is formed integrally with its supporting axle shaft (shown at 12', 12") by machining from an aluminium blank, the plane reflector face being polished by known diamond polishing techniques such as single point diamond machining or optical polishing to provide a surface finish requisite for the accurate reflection of the IR radiation.

The formation of the supporting axles integrally with the reflector avoids stresses normally set up around fixing points between reflector and axle which can cause distortion of the reflector surface if subjected to large temperature gradients or high angular acceleration rates associated with rapid changing of elevation angle, particularly if the reflector dimensions are such that the reflector is heavy and exerts considerable force on the fixing means.

The sighting system described is not of itself limited in respect of use or the type of radiation employed.

As well as the reflector 12 directing received radiation along the azimuth axis 22 onto a detector, radiation may also be transmitted by way of the reflector 12. Also, in addition to optical radiation, that is, in the visible, infra-red or ultra-violet part of the spectrum, the system may employ, or be employed with, longer wavelength microwave radar radiation; that is, the apparatus in general terms relates to the directing of a radiation path axis.

Furthermore the above described elevation and azimuth axes are not constrained to such orientations. For instance the axis 22 may comprise a nominally horizontal elevation axis.

The radiation path axis directing system has also been described as responsive to angular demands received. If the platform 11 is a moving vehicle the reflector 12 may be stabilised with respect to a desired radiation path axis despite vehicular moments by means of gyro stabilising means (not shown) commonly employed with reflectors pivotable about azimuth and elevation axes. Such gyrostabilisation means may be carried by the reflector assembly but preferably is carried by the platform 11 or support member 21 and provides signals to the servo-controlled positioning arrangement whereby the reflector orientation is stabilised in space, as well as directable to demanded radiation path axes.

We claim:

1. A radiation path axis directing system comprising a body rotatable about a first axis each side of a datum point and supporting a reflector rotatable about a second axis in the body orthogonal to the first, said reflector being arranged to deflect a radiation path axis along the first axis either side of the second axis in dependence on the orientation of the reflector about the second axis, and control means including a body drive motor responsive to demand of a new radiation path axis to position the body at an angular position with respect to the datum position at which the second axis is orthogonal to the demanded radiation path axis and orientate the reflector about the second axis to cause the radiation path axis to be deflected at the appropriate side of the second axis to define the direction of the demanded radiation path axis.

2. A system as claimed in claim 1 which the control means is arranged to define in each sense of rotation from the datum point a boundary point and is responsive to demand of a radiation path axis having an angular position between the datum and boundary points to cause the reflector to be orientated about the second axis to deflect the radiation path axis one particular side of the second axis and responsive to demand of a radiation path axis having an angular position beyond said boundary points to cause the reflector to be orientated about the second axis to deflect the radiation path axis the other side of the second axis.

3. A system as claimed in claim 2 in which the body is not limited in rotation about the first axis and the control means is arranged to determine the angular position of the body with respect to the datum point and define the angular positions of principal and secondary boundary points each displaced 90° from the angular position of the body.

4. A system as claimed in claim 3 in which the control means is arranged to determine whether a demanded radiation path axis direction (SD) about the first axis is beyond the boundary points by determining if either of the conditions SD−90−YO is positive, or SD+90−YO is negative holds true, where YO is the existing angular displacement of the body from the datum point.

5. A system as claimed in claim 2 in which the body is rotatable about the first axis between limit points displaced between 90° and 180° inclusive each side of the datum point and each boundary point is defined between the datum and limit points inclusive.

6. A system as claimed in claim 5 in which the boundary points are equally spaced at a predetermined fixed distance from the datum point between 90° and the limit point inclusive.

7. A system as claimed in claim 6 in which the boundary points are displaced at 90° from the datum point.

8. A system as claimed in claim 6 in which the control means is arranged to determine the angular position of the body with respect to the datum point and define the angular position of a principal boundary point in same sense of rotation from the datum position as a function of the existing angular position of the body and between 90° and the limit point inclusive from the datum point, and a supplementary boundary point in the other rotational direction displaced by 180° from the principal boundary point.

9. A system as claimed in claim 8 in which the boundary point in the same direction of displacement from the datum point as the existing angular body position exceeds the minimum 90° by a fraction of the existing angular body position related to the displacement from the datum point of the limit point.

10. A system as claimed in claim 9 in which the fraction is a constant for a particular displacement of datum point.

11. A system as claimed in claim 10 in which the fraction in the proportion of the rotational range of the body between the datum and limit point in excess of the minimum 90°.

12. A system as claimed in claim 11 in which the control means is arranged to determine whether a demanded radiation path axis direction (SD) about the first axis is beyond the boundary points by determining if either of the conditions SD−90)·L−YO·(L−90) is positive or (SD+90)·L−YO·(L−90) is negative holds true, where L is the displacement of each limit point from the datum point, YO is the existing angular displacement of the body from the datum point and displacement in the same sense as the existing body displacement is considered positive.

13. A system as claimed in claim 5 in which the control means includes a direct drive motor the rotor of which is coaxial with the second axis to position the reflector, angle resolving means operable to monitor the angular position of the reflector about the second axis, means for determining the rotational rate of the reflector about the second axis and means for determining the acceleration of the reflector about the second axis, said motor being connected in a feedback servo configuration.

14. A system as claimed in claim 13 in which the control means includes overtravel prevention means for preventing rotation of the body about the first axis beyond said limit points and comprising means responsive to the body in a margin in the vicinity a limit point to reduce the motor-driving servo loop gain as a function of the proximity of the rotational position of the body to the limit point.

15. A system as claimed in claim 14 in which said means comprises comparison means operable to compare the measured instantaneous position with a margin edge defining a margin, adjacent the limit position, and responsive to said instantaneous position being within the margin to reduce the gain of the feedback loop.

16. A system as claimed in claim 15 in which the margin edge is varied as a function of the velocity of body displacement.

17. A system as claimed in claim 13 in which the control means includes overtravel prevention means for preventing rotation of the body about the first axis beyond said limit points and comprising means for comparing the value of a demanded position signal with the limit position and responsive to a demand in excess of the limit position to limit the magnitude of the error signal produced by the error measuring means to a value no greater than that operable to move the body to the limit position.

18. A system as claimed in claim 1 in which the body is rotatable about the first axis between limit points displaced between 90° and 180° inclusive each side of the datum point and wherein the control means is arranged to determine from the minimum angular separation of the existing and demanded radiation path axes about the first axis the rotation required to take the body through said minimum angular separation from its existing angular displacement to a theoretical angular position achieving the demanded radiation path axis, is responsive to said rotation not requiring the body to cross a boundary, located between 90° from the datum point and the limit point inclusive to each side of the datum point, to effect said body rotation and is responsive to said body rotation requiring the body to cross said boundary to rotate the body to a position displaced 180° from said theoretical angular position and orientate the reflector about the second axis to deflect the radiation path axis to the opposite side of the second axis.

19. A system as claimed in claim 18 in which said boundary is defined by said limit points of body rotation.

20. A system as claimed in claim 1 in which the body drive motor comprises a direct drive motor, the rotor of which is coaxial with the first axis to position the body, and the control means includes angle resolving means operable to monitor the angular position of the body about the first axis with respect to the datum position, means for determining the rotational rate of the body about the first axis and means for determining the acceleration of the body about the first axis, said motor being connected in a feedback servo configuration.

21. A system as claimed in claim 20 in which the motor is a d.c.-torque motor and the means for determining the acceleration of the body about the first axis comprises transducer means operable to produce a signal having a magnitude proportional to the current supplied to the motor.

22. A system as claimed in claim 21 in which the acceleration transducer means comprises a low-value resistance element through which the motor current is passed and voltage sensing means operable to determine the voltage drop across the resistance element and produce a signal having a voltage level proportional to said voltage drop.

23. A system as claimed in claim 1 in which the control means includes digital processing means arranged to receive motor angular position signals and demanded radiation path axis signals in digital form and produce a digital position error signal representative of the rotation to be undergone by the motor, said conrol means including digital-to-analog conversion means operable to convert the digital position error signal to analog form and analog servo controller means operable to apply said analog position error signal to control the magnitude of current supplied by motor drive means.

24. A system as claimed in claim 23 in which the analog servo controller is arranged also to receive analog signals representing the rotational rate and acceleration of the motor and is responsive to configuration signals from the digital processing means to assume one of a plurality of different feedback transfer functions.

25. A system as claimed in claim 1 in which the control means includes digital processing means including checking means operable to prevent energisation of the drive motor unless the data processing means is functioning correctly.

26. A system as claimed in claim 1 in which the body comprises a bifurcated yoke assembly having two limbs, through which extends the second axis and between which is supported the reflector, and a yoke shaft portion extending along said first axis by which said yoke assembly is carried by, and rotatable relative to, a support member.

* * * * *